April 7, 1925.   1,532,378
E. H. CARROLL
MACHINE FOR PLANING HELICAL GEARS
Filed March 31, 1921   2 Sheets-Sheet 1

Inventor
E. H. Carroll
By Attorney
Geo. H. Kennedy Jr.

April 7, 1925.  1,532,378
E. H. CARROLL
MACHINE FOR PLANING HELICAL GEARS
Filed March 31, 1921  2 Sheets-Sheet 2
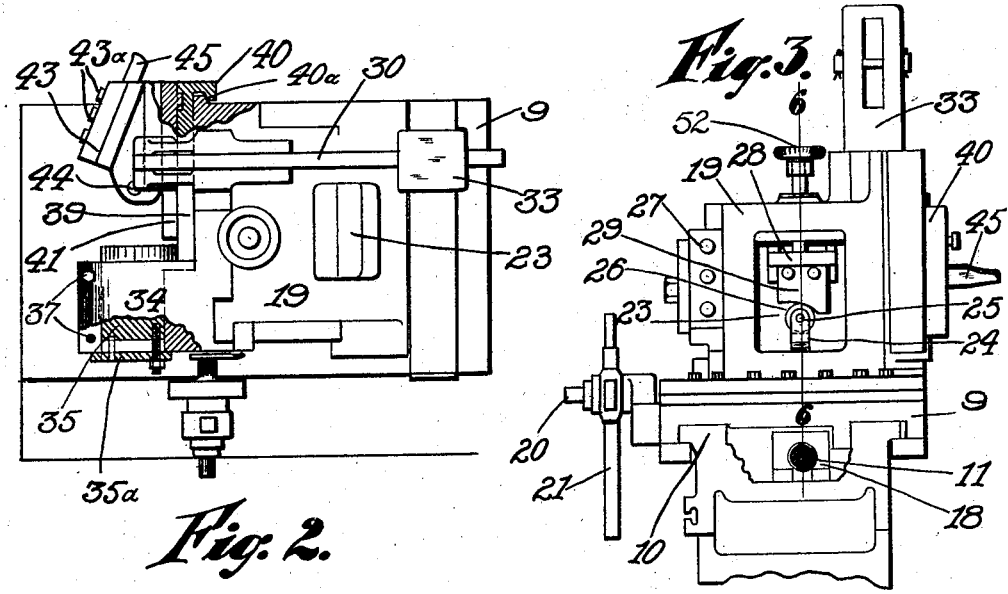
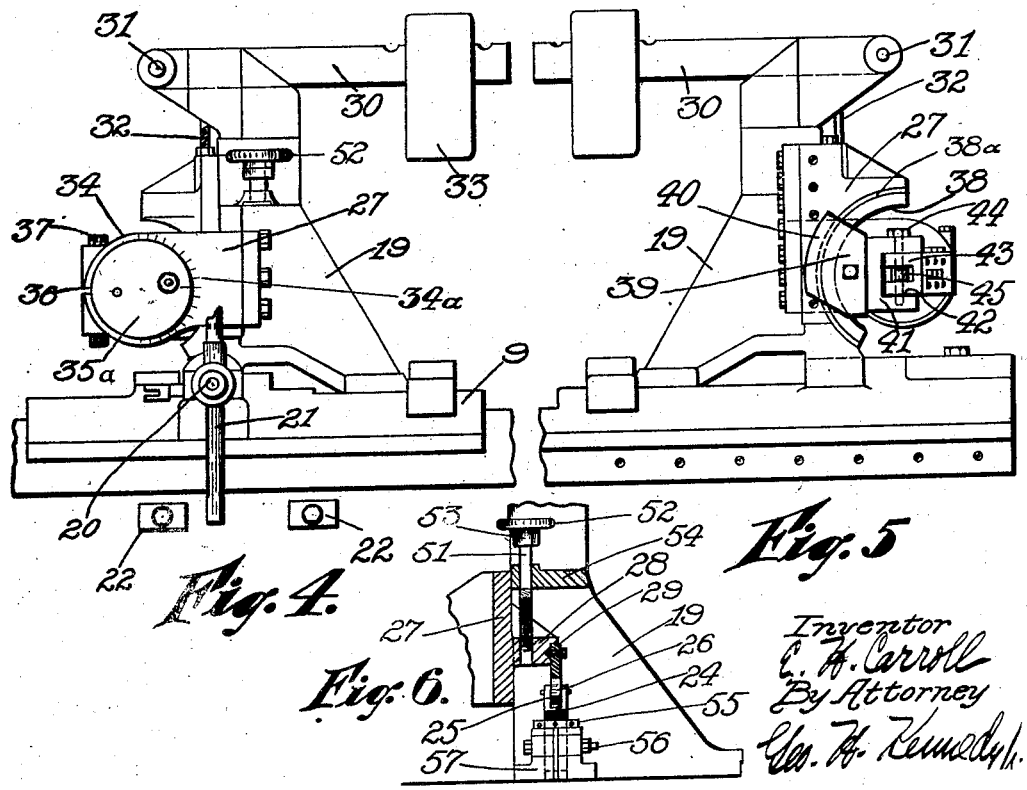
Inventor
E. H. Carroll
By Attorney
Geo. H. Kennedy Patented Apr. 7, 1925.

1,532,378

UNITED STATES PATENT OFFICE.

ELBERT H. CARROLL, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

MACHINE FOR PLANING HELICAL GEARS.

Application filed March 31, 1921. Serial No. 457,398.

*To all whom it may concern:*

Be it known that I, ELBERT H. CARROLL, a citizen of the United States, residing at Worcester, in the county of Worcester and Commonwealth of Massachusetts, have invented a new and useful Improvement in a Machine for Planing Helical Gears, of which the following, together with the accompanying drawings, is a specification.

My invention relates to a machine for forming teeth on gear wheels by the use of reciprocating cutting tools cooperating with a simultaneously operated work holding device.

In my copending patent application Serial No. 247,025, filed July 27, 1918, there is shown and described a machine for forming spiral gear teeth which embodies a particular arrangement of mechanism for operating the tool moving and work rotating devices, whereby to render the machine substantially universal in its action in cutting helical teeth of any desired angularity on blanks of different diameters.

By the present invention, I propose to provide a machine of the above described type with a novel arrangement of cutting devices, whereby the work may be operated upon by more than one cutting tool. My invention further provides an improved tool holder by means of which the tools may be readily adjusted and securely held in position for operating with any desired angularity of cut. These and other advantageous features of my invention will hereinafter more fully appear, reference being had to the accompanying drawings, in which Figure 1 is a plan view of a machine embodying my invention.

Figure 2 is an enlarged plan view partially in section showing my improved tool holder.

Figure 3 is an end view of the tool holder shown in Fig. 2.

Figure 4 is a side view of the tool holder looking in the direction of the work.

Figure 5 is a side view of the tool holder looking away from the work.

Figure 6 is a sectional view along the line 6—6, Fig. 3.

Like reference characters refer to like parts in the different figures.

Figures 1, 7:
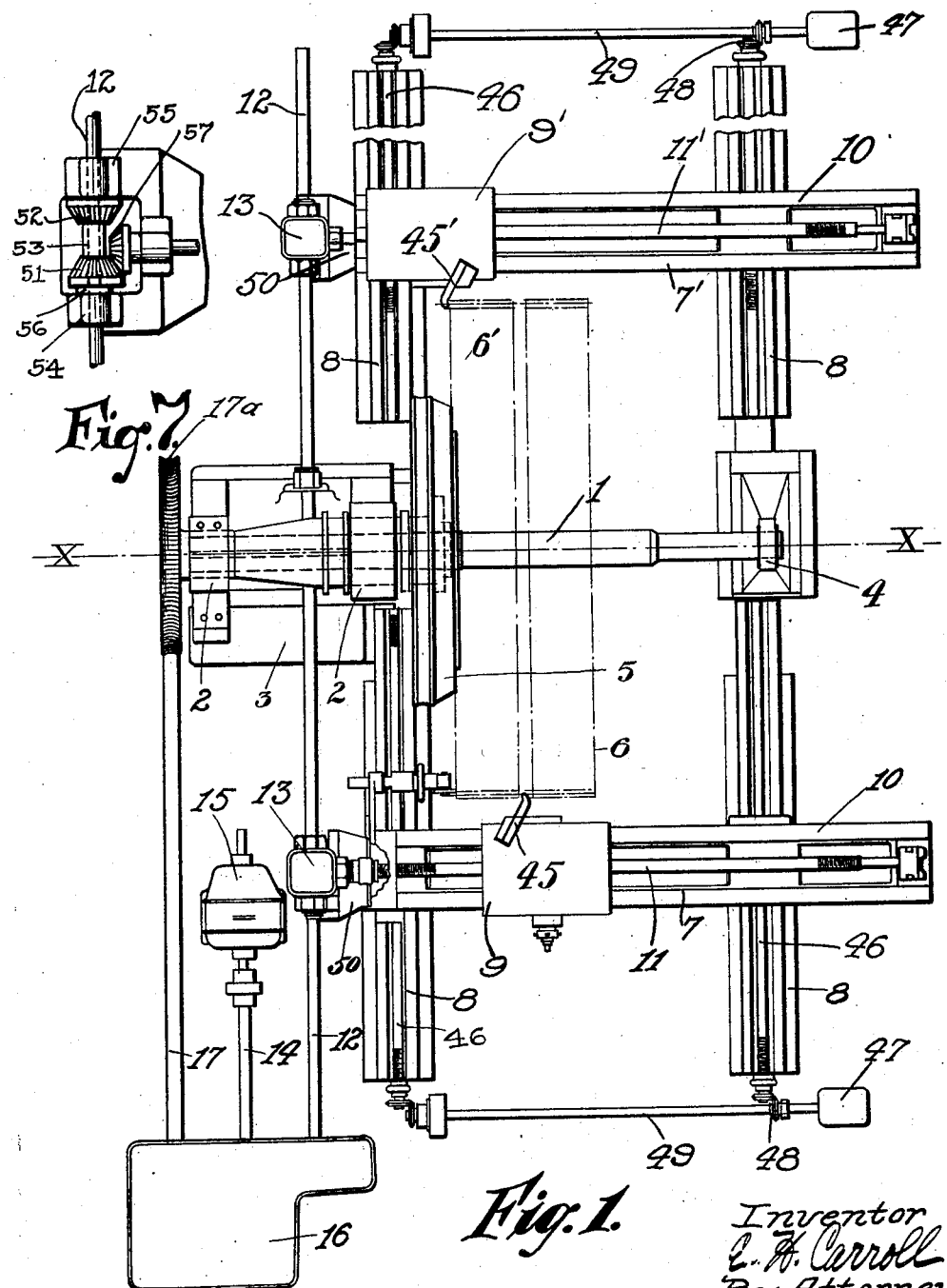
Figure 7 is a plan view showing a portion of the parts shown in Fig. 1 on an enlarged scale.

Referring to Fig. 1, a mandrel 1 is rotatably mounted at one end in bearings 2 extending upwardly from a base plate 3, and at its other end in a pedestal bearing 4. A blank carrier 5 is mounted on the mandrel 1 for supporting gear blanks 6, 6'.

Tool tables 7 and 7' are arranged on opposite sides of the mandrel 1 and are supported on suitable ways 8. Tool slides 9 and 9' are mounted on the tables 7 and are adapted to travel on suitable ways 10 extending parallel to the longitudinal axis X—X of the mandrel 1. Screw shafts 11 and 11' are provided on the tables 7 and 7' between the ways 10 and are connected to a shaft 12, extending across the base 3, by gearing 13, so that the tool slides 9 are adapted to be driven in unison therefrom. The shaft 12 is connected to a main driving shaft 14, coupled to an electric motor 15, by suitable gearing enclosed in a housing 16.

A second shaft 17 is connected to the drive shaft 14 by gearing also located within the housing 16, and the mandrel 1 is adapted to be driven from the shaft 17 by means of a worm, not shown, and a worm wheel 17ª. The particular arrangement of gearing within the housing 16 by means of which the shafts 12 and 17 may be driven in unison with different speed relations forms no part of my present invention, but is fully shown and described in my above mentioned copending patent application. By this particular arrangement of gearing, any desired relation between the rotative movement of the blank carrier 5 and the reciprocating movement of the tool slides 9 and 9' can be obtained, for securing the desired angularity of cut on the gear blanks.

Referring now to Figs. 2 to 6 inclusive, there is shown in detail one of the improved tool holders which are mounted on the slides 9 and 9'. Each slide is adapted to be moved back and forth on the ways 10 by means of the screw shaft 11 which passes through a nut 18 carried by the slide. An upwardly extending cross feed slide 19 is adapted for lateral movement on the horizontal slide 9 by means of a screw shaft 20 extending through the slide 19 and in threaded engagement therewith. The shaft 20 is provided at its outer end with a handle 21, by means of which the shaft 20 may be turned to move the slide 19 upon the slide 9. Stops 22 are arranged in the path of movement of the handle 21, so that the handle 21 will be turned when it engages either of the stops 22 during the movement of the slide 9. The handle 21 is connected to the shaft 20 by a suitable ratchet and pawl device, so that its engagement by the stops 22 will turn the shaft 20 only in one direction of rotation to cause the slide 19 to move across the slide 9, as the latter travels back and forth on the ways 10.

The slide 19 is provided with a central opening 23 into which projects a screw stud 24 adjustably mounted on the slide 9, as will be hereinafter described. The stud 24 is provided with ears 25 between which is rotatably mounted a roller 26. A vertical feed slide 27 is mounted for movement on the slide 19 and is provided with a lug 28 which projects into the opening 23 and carries a cam or former 29. The former 29 rests on the roller 26, so that the slide 27 will be moved vertically on the slide 19 as the latter is moved across the slide 9. An arm 30, pivotally mounted on the slide 19 at 31, is provided with a plunger 32 that holds the former 29 in engagement with the roller 26 by means of a weight 33.

The vertical feed slide 27 is provided with a hollow cylindrical portion 34 within which is mounted a cylindrical tool base 35. The portion 34 is split, as shown at 36, and the base 35 is adapted to be held therein by means of bolts 37 which draw the halves of the split portion 34 together. Index markings are provided on the portion 34, as shown at 34ª, to indicate the angular position of the base 35. The slide 27 is further provided with a semicircular seat 38 having the same center of curvature as the cylindrical portion 34. The tool base 35 is provided with a curved portion 39 which fits in the seat 38 and is provided with an end flange 40 extending beyond the seat 38. A conical surface 40ª is provided inside the flange 40 and is adapted to be held in wedging engagement with a similar conical surface 38ª, provided at the end of the seat 38 by means of a clamping plate 35ª, which coacts with the end of the cylindrical portion 34 to draw the tool base 35 longitudinally therein.

A hinge block 41 is mounted on the portion 39 of the base 35 and is provided with an opening 42 within which a clapper block 43 is pivotally mounted by means of a bolt 44. A tool 45 is carried by the clapper block 43 and is adapted to be secured in position thereon by means of bolts 43ª. The clapper block 43 is adapted to engage the hinge block 41 when the tool 45 engages the work at the beginning of its cutting stroke, but is free to turn about its pivot 44 on the hinge block 41 upon the return stroke of the tool 45.

From the foregoing description of the parts of the tool holder, it is apparent that each tool 45 is adapted to have movement in three directions during the operation of the machine. The horizontal movement of the slide 9 results in lateral movement of the cross feed slide 19 at the end of each cutting stroke, which movement of the slide 19 in turn causes movement of the vertical feed slide 27 through the former 29, the combined movements of all three slides determining the depth and form of the gear teeth.

Referring now to Fig. 1, the tool slides 9 and 9' are arranged so that the tools 45 and 45' are adapted to cut from the outside edges of the blanks 6 and 6' toward the space between the blanks, and as the slides are then driven in the same direction on the ways 10 by the shaft 12, the tools are adapted to cut alternately. With the parts in the position shown in Fig. 1, tool 45 has just finished its cutting stroke from right to left, while tool 45' is just about to start its cut from left to right. In this way, one tool is always cutting during movement of the slides 9 and 9', and each tool is adapted to form teeth on its blank independently of the operation of the other tool. My improved arrangement of cutting devices thus not only results in an increased production for the machine due to continuous cutting during movement of the tool slides, but also permits teeth to be cut on different gear blanks independently of each other. Obviously the application of my invention may be extended by increasing the number of blanks carried on the mandrel 1 and the number of tool slides 9 mounted on the tables 7. It is also apparent that either straight spur or helical gear teeth may be cut by the tools.

Referring again to Fig. 1, the tool tables 7 and 7' are adapted to be moved sidewise with respect to the mandrel 1 by means of screw shafts 46 extending between the ways 8. The shafts 46 are connected to suitable sources of power, such as electric motors 47, by means of gearing 48 and cross shafts 49. The gearing 13 which connects the shafts 11 and 11' of the tool tables 7 and 7' to the shaft 12 is carried on brackets 50 extending from the tool tables 7, the driving gears being connected to the shaft 12 by sliding keyways so that the entire gearing 13 will move with the tool tables 7 and 7' when either one of the latter is shifted on the ways 8 preparatory to mounting a blank on the mandrel 1.

Referring now to Fig. 7, the gearing 13 carried by each bracket 50 comprises a pair of bevel gears 51 and 52 mounted on a slidable sleeve 53 keyed to the shaft 12. The sleeve 53 is adapted to be positioned between bearings 54 and 55 by means of a spacing collar 56, so that one of the gears 51 and 52 is always held in mesh with a bevel pinion 57 mounted on the end of the shaft 11. By means of this arrangement, it is possible to drive the shafts 11 and 11' either in the same direction of rotation, as previously described with reference to Fig. 2, or in the opposite direction of rotation, it only being necessary to shift the sleeves 53 in order to mesh the proper gear with the pinion 57. In this way the tools 45 and 45' may be caused to travel in the same direction and cut alternately, or they may be caused to travel in opposite directions and cut simultaneously. The screw shafts 11 and 11' are adapted to cause reciprocation of the tool slides 9 and 9' in either direction, at substantially the same rate of movement, thereby insuring uniformity in the operation of the tools 45 and 45'.

The tools 45 and 45' are adapted to be positioned for any desired angle of cut by means of the angularly adjustable tool bases 35. It is obvious that each tool base 35 may be turned bodily within the cylindrical portion 34 in order to give any desired angularity to the cutting edge of the tool, after which the base may be securely fixed in position by the clamping plate 35ª and the bolts 37. The wedging action between the conical surfaces 38ª and 40ª prevents the base 35 from turning after it has once been adjusted, for any tendency of the base to turn while the tool is cutting, only causes it to be wedged in position more tightly.

The former 29 may also be readily adjusted or changed by means of a lifting screw 51, as best shown in Fig. 6. The screw 51 is in threaded engagement with the lug 28 which carries the former 29 and is provided at its upper end with a handle 52 and a shoulder 53. The former 29 may be lifted off of the roller 26 by turning the screw 51 into the lug 28 until the shoulder 53 engages the top portion 54 of the slide 19, whereupon further turning of the handle 52 will cause the whole vertical feed slide 27 to be raised. The height of the roller 26 may be adjusted for different formers by turning an adjustment collar 55 in threaded engagement with the stud 24. The stud 24 is adapted to be locked against turning after such an adjustment by means of clamping bolts 56, provided on a split base 57 into which the stud 24 extends.

The above described arrangement of parts for obtaining movement of the vertical feed slide 27 is believed to be particularly advantageous, not only from the standpoint of ready adjustment of the former 29 and roller 26, but also owing to the fact that the roller 26 is mounted solidly upon the horizontal slide 9, and is, therefore, well adapted to bear the strain of lifting the vertical slide 27 and its tool holding devices.

From the foregoing it is apparent that I have provided a machine for cutting helical or spur gears that is extremely flexible in its operation, and is particularly adapted for the rapid cutting of gear teeth on one or more blanks at the same time. The provision of tool tables on opposite sides of the work supporting mandrel also results in a well balanced machine in which the tools are adapted to cut either alternately or simultaneously and in either direction of movement of the tool slides. My improved tool holder embodying an angularly adjustable tool base makes it possible to operate with any desired angularity of cut, with the assurance that the tool will not change its position during the cutting.

While I have shown the various features of my invention in connection with a gear cutting machine embodying the same general principles of operation as set forth in my above mentioned copending patent application, my invention is not so limited, for its several features may as well be embodied in any other machine for cutting gear teeth. I desire therefore that only such limitations may be imposed thereon as come within the scope of the appended claims.

I claim:

1. In a machine of the class described, the combination with a rotary blank carrier, a blank mounted thereon and a reciprocating tool slide, of a tool base carrying a tool for engagement with the blank, the said tool base being turnable bodily about an axis passing through the cutting point of said tool at right angles to the line of movement of the slide.

2. In a machine of the class described, a tool holding device comprising a slide and a tool base having a cylindrical portion turnable on said slide about an axis at right angles to said slide, the axis of said cylindrical portion passing through the cutting point of the tool.

3. In a machine of the class described, a tool holding device comprising a slide, a tool base having a cylindrical portion turnable on said slide, and means for moving said tool base longitudinally, at right angles to said slide.

4. In a machine of the class described, a tool holding device comprising a slide, a tool base having a cylindrical portion turnable within a seat provided on said slide, and means for moving said tool base longitudinally along its seat to secure it against turning movement within said seat.

5. In a machine of the class described, a tool holding device comprising a slide, a tool base having a cylindrical portion turnable within a seat provided on said slide, the said base and the slide having opposed conical surfaces, and means for moving said tool base along its seat to bring said conical surfaces in wedging engagement.

6. In a machine of the class described, a a tool holding device comprising a slide, a tool base having a cylindrical portion turnable within a seat provided on said slide, the said base and the slide having opposed conical surfaces concentric about the longitudinal axis of said seat, and means for moving said base axially to bring said conical surfaces in wedging engagement.

7. In a machine of the class described, the combination with a tool holding device comprising a horizontally movable slide, a cross slide adapted for lateral movement thereon and a vertically movable slide adapted to move with said cross slide, of a roller mounted on said horizontal slide, and a former mounted on said vertical slide in engagement with said roller, whereby lateral movement of said cross slides causes movement of said vertical slide.

8. In a machine of the class described, the combination with a tool holding device comprising a horizontally movable slide, a cross slide adapted for lateral movement thereon and a vertically movable slide adapted to move with said cross slide, of a vertically adjustable roller mounted on said horizontal slide, a former mounted on said vertical slide and held in engagement with said roller, and means carried by said cross slide for lifting said former out of engagement with said roller.

9. In a machine of the class described, the combination with a rotating actuating member and a rotary blank carrier, of tool slides arranged to travel on opposite sides of and parallel to the rotational axis of said carrier, and means for connecting said slides to said actuating member so as to be simultaneously moved in either the same or in opposite directions.

10. In a machine of the class described, the combination with a rotating actuating member, a blank carrier and screw shafts arranged on opposite sides of said blank carrier for moving cutting tools, of gearing for connecting said screw shafts to said actuating member, whereby said screw shafts may be simultaneously driven in either the same or in the opposite direction of rotation.

Dated this 24th day of March, 1921.

ELBERT H. CARROLL.

Witnesses:
WILLARD A. WINN,
M. OLIVE CROSS.